US010727966B1

(12) United States Patent
Izenberg et al.

(10) Patent No.: US 10,727,966 B1
(45) Date of Patent: Jul. 28, 2020

(54) TIME SYNCHRONIZATION WITH DISTRIBUTED GRAND MASTER

(71) Applicant: Amazon Technologies, Inc., Seattle, WA (US)

(72) Inventors: Erez Izenberg, Tel Aviv (IL); Nafea Bshara, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 15 days.

(21) Appl. No.: 15/691,503

(22) Filed: Aug. 30, 2017

(51) Int. Cl.
*H04J 3/06* (2006.01)

(52) U.S. Cl.
CPC .......... *H04J 3/0667* (2013.01); *H04J 3/0641* (2013.01); *H04J 3/0676* (2013.01)

(58) Field of Classification Search
None
See application file for complete search history.

(56) References Cited

U.S. PATENT DOCUMENTS

| | | | | |
|---|---|---|---|---|
| 2007/0258550 | A1* | 11/2007 | Wang | H04J 3/0664 375/354 |
| 2009/0016475 | A1* | 1/2009 | Rischar | H04J 3/0697 375/356 |
| 2012/0320794 | A1* | 12/2012 | Belhadj | H04J 3/0667 370/254 |
| 2013/0308658 | A1* | 11/2013 | Le Pallec | H04J 3/0697 370/503 |
| 2014/0185632 | A1* | 7/2014 | Steiner | H04J 3/0641 370/503 |
| 2015/0003479 | A1* | 1/2015 | Shenoi | H04J 3/0661 370/503 |
| 2015/0121115 | A1* | 4/2015 | Chandra | H04J 3/0667 713/400 |
| 2017/0302392 | A1* | 10/2017 | Farra | H04B 10/0793 |
| 2018/0059712 | A1* | 3/2018 | Kazehaya | G06F 1/12 |

OTHER PUBLICATIONS

Precision Time Protocol (PTP/IEEE-1588). [online]. End Run Technologies [retrieved on Jul. 13, 2017]. Retrieved from the Internet: <URL: https://www.endruntechnologies.com/pdf/PTP-1588.pdf >, 6 pages.

* cited by examiner

*Primary Examiner* — Phirin Sam
(74) *Attorney, Agent, or Firm* — Kilpatrick Townsend & Stockton LLP

(57) ABSTRACT

In various implementations, provided are techniques for distributing network time across a network using multiple grand masters (e.g., master time keepers). These techniques include having multiple grand masters simultaneously providing time to the network. Simultaneous means that all the grand masters are active at the same time, and none are designated as backups. In various implementations, the nodes in the network can simultaneously synchronize to network times provided by more than grand masters so that the nodes can obtain more than one network time. Using these multiple network times, nodes configured as clients can determine one network time. The client devices can then use the single network time in applications that require a time.

20 Claims, 10 Drawing Sheets

TIME SYNCHRONIZATION WITH DISTRIBUTED GRAND MASTER

BACKGROUND

Network devices in a network use time for various purposes. Network devices, including host devices and network infrastructure devices, can use the current time for purposes internal to an individual device, such as for example to apply a timestamp to a file when the file is created or modified, to apply timestamps to searches and other activity in a database, to apply timestamps to activities recorded in log files, and/or to track a current up time (how long the device has been powered on), among other things.

Network devices can also use the current time for external purposes, including inserting timestamps into network packets and attaching timestamps to events that are communicated to the network. A network device can, for example, attach a timestamp to a packet when transmitting the packet. As another example, a network device can extract a timestamp from a packet received from the network, and compare the extracted timestamp against a time being maintained by the network device.

Timestamps can further be used to analyze the performance of a network. For example, timestamps can be used to measure the latency across the network. Latency across the network can be measured, for example, as an average amount of time a packet needed to traverse the network from a source device to a destination device. Timestamps can also, for example, be used to measure packet throughput, that is, the number of packets that can cross the network at a given moment.

Network devices can maintain time individually. A network device can have an internal clock circuit that is driven, for example, by a crystal oscillator. The clock circuit can increment every second, every millisecond, or at some fraction of a second. At any given moment, the clock circuit can provide the current time as a numerical value. The numerical value can then be inserted into file system records, database records, log files, and/or packets.

BRIEF DESCRIPTION OF THE DRAWINGS

Various embodiments in accordance with the present disclosure will be described with reference to the drawings, in which.

DETAILED DESCRIPTION

Figure 1:
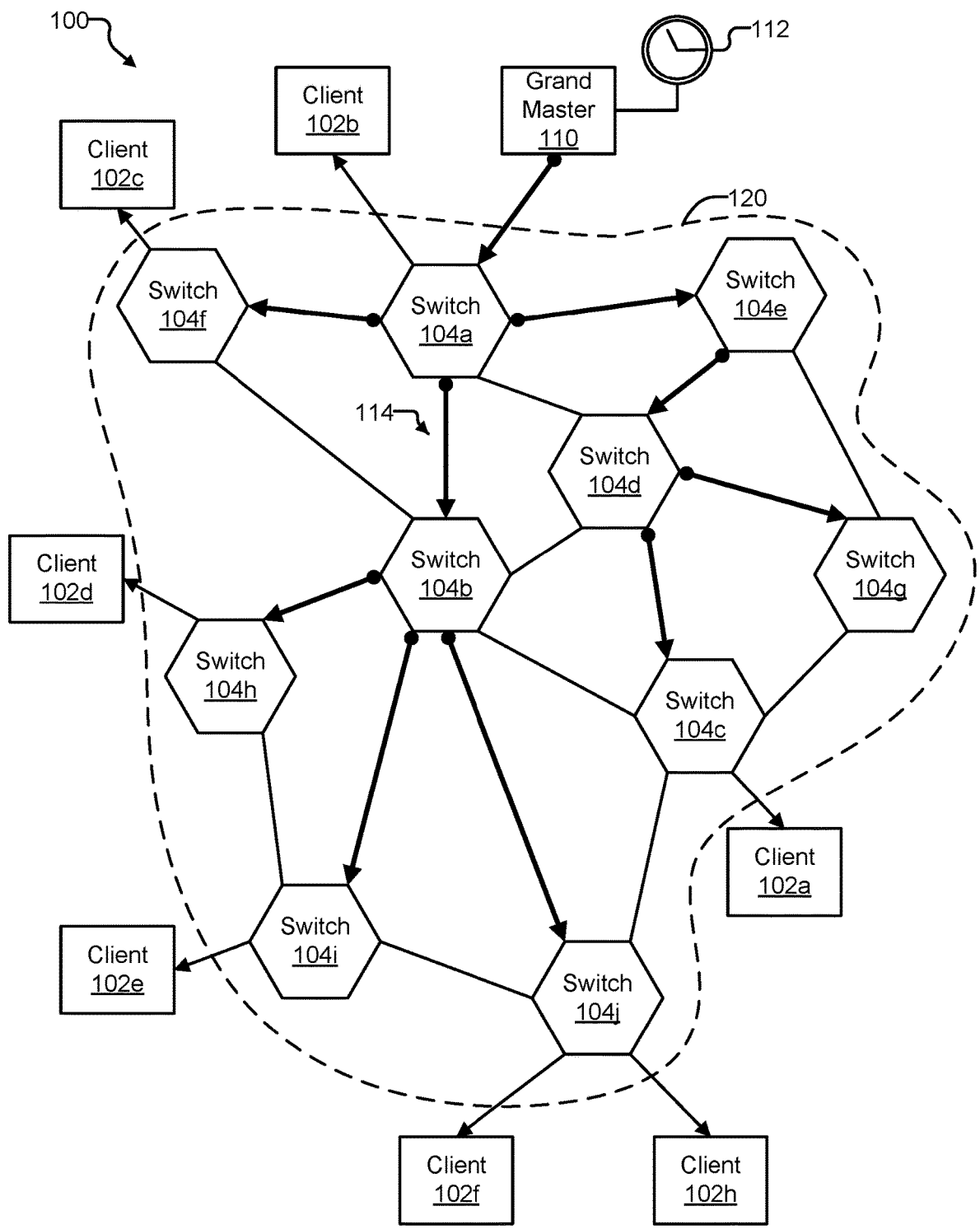
FIG. 1 illustrates an example of a computer network that includes a grand master to provide a network time to the network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Network devices in a network use time for various purposes. Time, in this context, can mean one or more of a year, month, day, hour, minute, second, and/or fraction of a second, where fractions of a second can be provided in milliseconds, nanoseconds, femtoseconds, etc. Time can also include a clock frequency. Network devices, including host devices and network infrastructure devices, can use the current time for purposes internal to an individual device, such as for example to apply timestamp to a file when the file is created or modified, to apply timestamps to searches and other activity in a database, to apply timestamps to activities recorded in log files, and/or to track a current up time (how long the device has been powered on), among other things. The time can also be provided to software applications executing on the network device, such as for example when the software applications require time as part of normal operations.

Network devices can also use the current time for external purposes, including inserting timestamps into network packets and attaching timestamps to events that are communicated to the network. A network device can, for example, attach a timestamp to a packet when transmitting the packet. In this example the timestamp can indicate the time at which the network device transmitted the packet. As another example, a network device can extract a timestamp from a packet received from the network, and compare the extracted timestamp against a time being maintained by the network device. The timestamp, in this example, can be used to determine an amount of time it took for the packet to reach the network device.

Timestamps can further be used to analyze the performance of a network. For example, timestamps can be used to measure the latency across the network. Latency across the network can be measured, for example, as an average amount of time a packet needed to traverse the network from a source device to a destination device. Timestamps can also, for example, be used to measure packet throughput, that is, the number of packets that can cross the network at a given moment. Timestamps can thus be useful for monitoring and improving the performance of a network.

Network devices can maintain time individually. A network device can have an internal clock circuit that is driven, for example, by a crystal oscillator. The clock circuit can increment every second, every millisecond, or at some fraction of a second. At any given moment, the clock circuit can provide the current time as a numerical value. In network devices, the numerical value is typically an offset from what is known as the epoch time, which sets time zero at 12:00 am, Jan. 1, 1970.

For timestamps to be meaningful and useful, the time being used by each device in a network should be approximately the same. Approximately the same means that the time maintained by each network device is similar to within an acceptable degree of difference. Differences in time that are outside of the acceptable degree of difference may cause values such as latency and throughput measurements to be inaccurate.

Various time synchronization protocols can be used to synchronize the devices in a network to a common network time. In small networks, where most of the network devices may be directly connected to one another, these time synchronization protocols can synchronize the network devices relatively accurately, such as to within about 100 nanoseconds (ns). In very large networks, however, time synchronization protocols may suffer some deficiencies. For example, a time protocol may call for a device in the network to be designated as a master time keeper, also referred to herein as a time provider or grand master. The master time keeper can be configured to maintain highly accurate time, for example by being connected to an atomic clock or a satellite navigation system receiver. A device in the network, however, may lose the ability to communicate with the master time keeper, or packets for synchronizing the time may be dropped in the network. When any of these events occur, the device, or possibly an entire segment of the network, may no longer be synchronized to the same time.

A possible solution for the problem of losing touch with the master time keeper is for the network to include at least one back-up master time keeper. When the primary master time keeper becomes disabled or unreachable, the backup master time keeper can be activated to provide a network time to the part of the network that cannot reach the primary master time keeper. But a period of time may be required for devices in the network to synchronize to the time provided by the backup master time keeper. Additionally, any part of the network that is still able to communicate with the primary master time keeper may be synchronized to a different time.

Another problem with relying on one master time keeper is that, in networks that includes hundreds of thousands of nodes, network latencies from one end of the network to another may be significant. Thus, a network device that is very far, in terms of network links, from the master time keeper may synchronize to a network time that is delayed from the network time at the master time keeper. In a very large network, network devices that are very far from the master time keeper may have a different time from network devices that are close to the master time keeper.

Highly accurate time may be of particular importance in high-performance, high reliability networks. To maintain high performance, network analytics may be constantly monitoring latency and throughput, and the network may be continuously adjusted to relieve congestion, bypass link failures, and/or to manage bursts of dense network traffic. To maintain high reliability, the network may be configured with redundant links, so that, in the best case, all host devices on the network can be reached even when links or nodes in the network fail. In order for timestamps to remain accurate in a high reliability network, time synchronization across the network should also be reliable.

In various implementations, provided are techniques for distributing network time across a network using multiple grand masters (e.g., master time keepers). These techniques include having multiple grand masters simultaneously providing time to the network. Simultaneous means that all the grand masters are active at the same time, and none are designated as backups. In various implementations, the nodes in the network can simultaneously synchronize to network times provided by more than grand masters, so that the nodes can obtain more than one network time. Using these multiple network times, nodes configured as clients can determine one network time. The client devices can then use the single network time in applications that require a time.

Having simultaneous access to multiple network times can alleviate the limitations of time protocols. For example, should any one grand master go offline or otherwise become unreachable, the network can use the network time from the remaining grand masters to determine the official network time. As another example, by using network time from grand masters located at various points across the network, network latency can be averaged out, so that the distance between a client device and any one grand master can be inconsequential.

FIG. 1 illustrates an example of a computer network 100 that includes a grand master 110 to provide a network time to the network 100. The example network 100 includes a switch fabric 120, through which multiple network devices configured as client devices 102a-102f can communicate with one another. The client devices 102a-102f can be, for example, server computers, data storage arrays, personal computing devices, and/or printers or other peripheral devices, among other things. The client devices 102a-102f can use one or more network protocols to transmit packets across the switch fabric 120. Though only a small number of client devices 102a-102f are illustrated in this example network 100, other example networks can include thousands or hundreds of thousands of client devices.

A switch fabric, which may also be referred to as a switching fabric, can include multiple interconnected network infrastructure devices. In the illustrated example, the switch fabric 120 is illustrated with multiple switches 104a-104j. In other examples, the switch fabric 120 can include a combination network infrastructure devices, including switches, routers, hubs, and/or repeaters, as well as gateway devices that can connect the network 100 to other networks. Though only a few switches 104a-104j are illustrated, a switch fabric can include thousands or hundreds of thousands of switches and/or other network infrastructure devices.

In various implementations, the client devices 102a-102f can be connected to switches 104a-104j at the boundary or edges of the switch fabric 120. The switches 104a-104j may each have multiple connections to other switches 104a-104j within the switch fabric 120, such that there can be multiple paths from one client device 102a-102f to another client device 102a-102f across the switch fabric 120. In various implementations, packets from one client device 102a-102g to another client device 102a-102g can be sent using different paths in the switch fabric 120. Doing so can be beneficial for achieving high throughput and low latency, in that the packets can travel over the shortest path and/or the least congested path. The multiple paths can also be beneficial for reliability, in that, should a link between any two switches 104a-104j fail, packets can use a different link to reach the same destination.

As discussed above, each client device 102a-102f and each switch 104a-104j in the example network 100 may individually be maintaining the current time, including a date, hour, minute, second, and/or fraction of a second. The time being maintained internally by an individual device will be referred to herein as the device time or device local time. Each client device 102a-102f and switch 104a-104j may be using a device local time for internal purposes, such as for counters, alarms, and/or displaying a clock. Each client device 102a-102f and switch 104a-104j may also be using a device local time for external purposes, such as attaching timestamps to transmitted packets or comparing timestamps in received packets to the current time. The individual devices can also be using a device local time to assign timestamps to events occurring in the network 100, such as link failures, new links being established, snapshots of network statistics, and so on.

For timestamps being passed around the network 100 to be meaningful, the device time of each client device 102a-102f and switch 104a-104j should be synchronized to a common time, which will be referred to herein as the network time. Assume, for example, that the device time at a first client device 102b is a few seconds ahead of the device time at a second client device 102e. In this example, when the second client device 102e receives a packet from the first client device 102b, a timestamp in the packet will include those few seconds, and thus it may seem, at the second client device 102e, that the packet arrived faster than it really did. To provide a more concrete example, the packet can be transmitted by the first client device 102b when the time at the first client device 102b is 10:00:05 and the time at the second client device 102e is 10:00:00. The packet may arrive at the second client device 102e when the time at the second client device 102e is 10:00:10 and the time at the first client device 102b is 10:00:15. In this example, according to the time at the first client device 102b, the packet took ten seconds to reach the second client device 102e, but according to the time at the second client device 102e, the packet took five seconds to arrive.

Confusion over the time can be compounded as a packet traverses the switch fabric 120. For example, each switch 104a-104j may attach a timestamp to a packet, which can be used to trace a packet's route through the switch fabric 120. A packet transmitted by a first client device 102b may pass through switch 104a, switch 104b, and switch 104i to reach a second client device 102e. Another packet from the first client device 102b can pass through switch 104a, switch 104d, switch 104c, switch 104j, and switch 104i to reach the second client device 102e, which, though a longer route, may be a faster route because of congestion along the other route. Without synchronized time across the switch fabric 120, understanding the different latency across these paths may be difficult.

To provide a common, official network time, in various implementations, the example network 100 can be configured with a time synchronization tree 114. In various implementations, the network 100 can use the time synchronization tree 114 to synchronize each device in the network to a common, network time. The time synchronization tree 114 uses the existing network links used by the switches 104a-104j to transfer network traffic, and do not require special or dedicated network links. Thus, in the illustrated example, the paths in the time synchronization tree 114 have been illustrated as overlaying the network links in the switch fabric 120.

Using a tree structure to distribute the network time to the network 100 ensures that, for any given device in the network, only one neighboring device (the parent vertex in the tree) will be providing the time to the given device (a child vertex in the tree). Neighboring, in this context, describes devices that share a network link (e.g., switch 104a and switch 104d share a network link). Having more than one device provide the network time to any given node may create an ambiguity as to which provider's time is the correct time, thus each node may have only time provider. A given device itself can be the time provider for multiple other devices, so that the time can be distributed across the network 100 quickly.

In time synchronization tree 114, the a network device has been designated as a time provider, or grand master 110. The grand master 110 functions as the root of the time synchronization tree 114, and provides the network time to the network 100. Any device that is able to maintain a time, including network infrastructure devices, can be a grand master. For example, one of the switches 104a-104j can be designated as the root of the time synchronization tree 114. In this example, in some implementations, the master time keeper switch may provide the time from a local processor.

In some implementations, the grand master 110 can use its own device local time as the network time. Alternatively or additionally, in some implementations, the grand master 110 can include or be connected to a clock source 112. The clock source 112 can be, for example, an atomic clock or a satellite navigation system receiver, such as a Global Positioning System (GPS) receiver, which can obtain the time from a satellite system. The clock source 112 can otherwise be some other device capable of keeping or obtaining highly accurate time. The clock source 112 may provide the time with a higher degree of precision than the grand master's internal clock may be capable of.

Alternatively or additionally, in some implementations, the grand master 110 may receive the network time from a control plane, which can be local or can be remote to the grand master 110 itself. The control plane is the part of a network that carries signaling traffic and is responsible for routing. Functions of the control plane include system configuration and management. The control plane, the data plane, and the management plane are the three basic components of a telecommunication architecture. The control plane and management plane serve the data plane, which bears the traffic that the network exists to carry. The management plane, which carries administrative traffic, is considered a subset of the control plane.

In the time synchronization tree 114, each of the switches 104a-104j function as vertices in the tree structure, for purposes of distributing the network time. The branches of the tree structure provide paths, over existing network links, from the grand master 110 to each switch 104a-104j in the switch fabric 120. Each path has been determined such that there is a single path from the grand master 110 to each switch 104a-104j, in accordance with the tree structure. For example, the grand master 110 is connected to the switch 104a. From the switch 104a, the time synchronization tree 114 includes individual paths to switch 104f, switch 104b, and switch 104e. From switch 104b, there are paths to switch 104h, 104i, and 104j. Returning to switch 104e, from switch 104e there is a path to switch 104d. From switch 104d, there are paths to switch 104c and 104g.

Each of the switches 104a-104j in the switch fabric 120 can use the paths provided by the time synchronization tree 114 to synchronize to the network time. Using, for example, time synchronization protocols (discussed further below), the grand master 110 can synchronize the time the nearest switch, switch 104a. The switch 104a can further synchronize with neighboring switches 104b, 104d, 104f, as designated by the time synchronization tree 114. These switches 104b, 104d, 104f can then synchronize with their neighboring switches 104d, 104h, 104f, 104j, and so on until the end of each path in the time synchronization tree 114 is reached. The client devices 102b-102f in the network 100 can further synchronize with the nearest switch 104a, 104f, 104h, 104i, 104*j* to which each client device 102*b*-102*f* is connected. In this way, each client device 102*a*-102*f* and each switch 104*a*-104*j* can obtain one common network time.

The network 100 can be configured to use various techniques to synchronize the network time across the network 100. These techniques can involve an exchange of network packets between a network device acting as a time provider, also referred to as a time source or master, and a network device acting as time recipient, also referred to as a time destination or slave. Using the network packets, the time provider and the time recipient can determine a difference between the time being kept by each device. The time recipient can then use the difference to adjust its time to be approximately the same as the time of the time provider. The time at the time recipient can match the time of the time provider within a certain degree of accuracy, such as within a millisecond or within a nanosecond, or within some other fraction of a second. Various time synchronization protocols can provide varying degrees of accuracy. For example, in a local area network, the Network Time Precision (NTP) protocol can match the time between the time provider and the time recipient to within one millisecond (ms) or less. As another example, Precision Time Protocol (PTP) can achieve accuracy to within a less than a microsecond ($\mu$s). Time synchronization protocols are discussed further below with respect to FIG. 3.

In the example of FIG. 1, each switch 104*a*-104*j* and/or each port of a switch can be a time provider, and each switch 104*a*-104*j* and/or each port of a switch can be a time receiver. Ports from which time is being provided are illustrated using dots, and ports at which time is being received are illustrated using arrowheads. For example, the switch 104*a* is the time provider for three switches 104*f*, 104*b*, 104*d*. Similarly, switch 104*b* provides the time to switch 104*f*, switch 104*f*, and so on.

Time synchronization typically occurs periodically. The network 100 may synchronize the entire network 100 more frequently when the network is initially brought up, so that each device in the network 100 can converge to the common, network time. Once the network time has been established at each device, the network 100 can synchronize less frequently, to maintain the network time across the network 100. Small differences in the internal clocks of each device may cause the device local times of each device to gradually differ, or drift, from one another. The network 100 can thus be configured to synchronize all the devices to the network time at regular intervals. In some implementations, synchronization can also be triggered when a new device is added to the network. In these implementations, the entire network 100 may be resynchronized, or only devices in the neighborhood of the new device may be synchronized. Synchronization of the whole network 100 or in the area of the new device may be more frequent for a short period, until the new device, and any devices receiving the network time from the new device have received the network time.

The time synchronization tree 114 may be adequate for distributing the network time across the network 100, particularly when the network 100 is relatively small. Network link failures, or a switch going offline, can be problematic for time synchronization, but the impact in a small network may be acceptable. For example, when a network link fails in a small network, it may be that only a few devices in the network can no longer synchronize to the network time. Additionally, a small network may be able to tolerate a little less time accuracy while the link failure is fixed, since there may be few devices, few network links, and/or less concern over the latency and throughput of the network.

When the network 100 is very large, however, a single link failure may cause a large part of the network 100 to be disconnected from the network time. Ordinary network traffic may suffer little disruption, since the network traffic can take a route through the network that bypasses the failed link. But, in a tree structure, because each network device has only one path to the grand master 110, once a network link fails, all paths connected through that link are affected.

Figure 2:
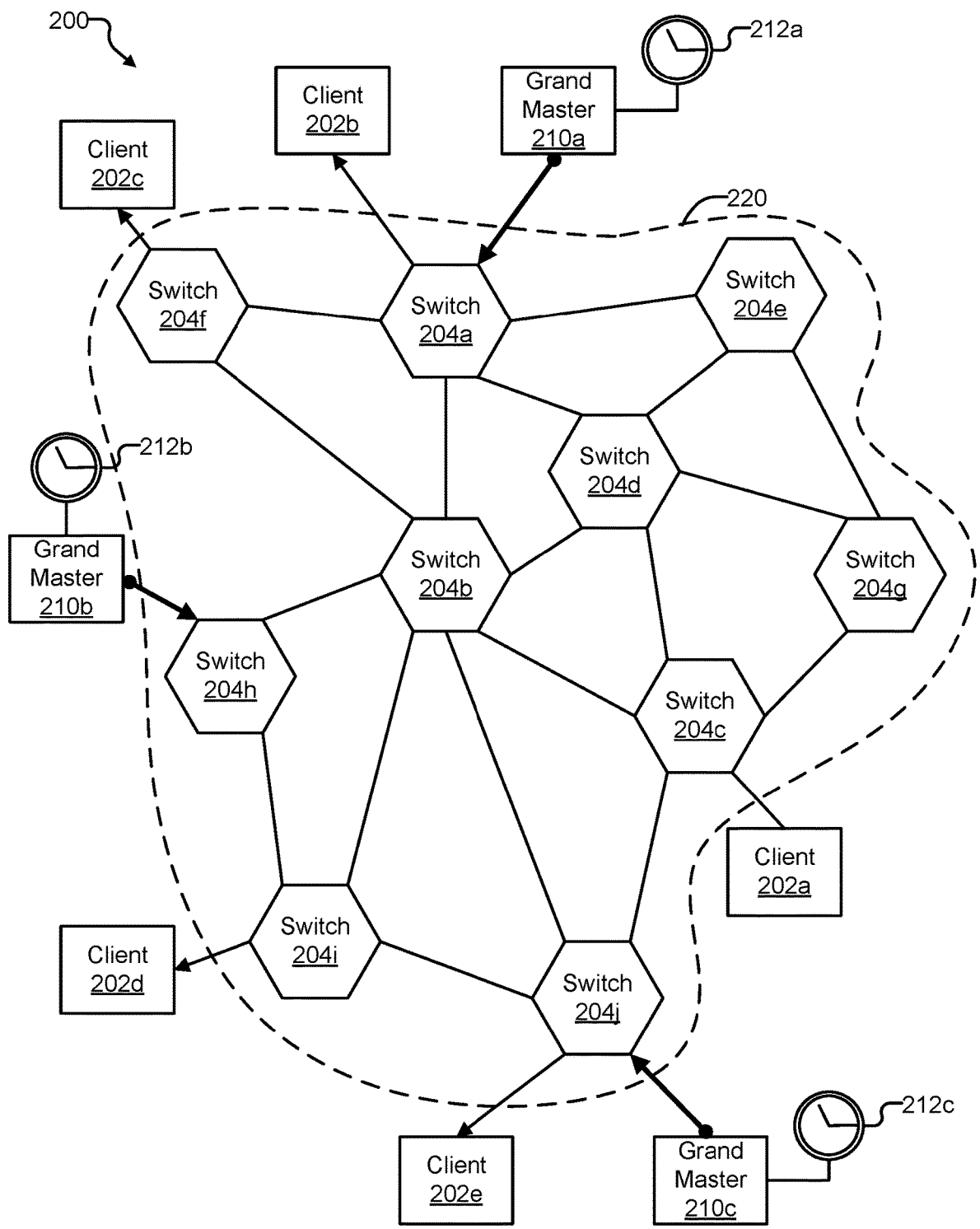
FIG. 2 illustrates an example of a network that includes multiple grand masters.

FIG. 2 illustrates an example of a network 200 that includes multiple grand masters 210*a*-210*c*. Having multiple grand masters 210*a*-210*c* can alleviate some of the issues when a network, particularly a very large network, has only one grand master. The example network 200 includes a switch fabric 220, through which multiple network devices configured as client devices 202*a*-202*e* can communicate with one another. The client devices 202*a*-202*e* can be, for example, server computers, data storage arrays, personal computing devices, and/or printers or other peripheral devices, among other things. The client devices 202*a*-202*e* can use one or more network protocols to transmit packets across the switch fabric 220. Though only a small number of client devices 202*a*-202*f* are illustrated in this example network 200, other example networks can include thousands or hundreds of thousands of client devices.

In the illustrated example, the switch fabric 220 is illustrated with multiple switches 204*a*-204*j*. In other examples, the switch fabric 220 can include a combination network infrastructure devices, including switches, routers, hubs, and/or repeaters, as well as gateway devices that can connect the network 200 to other networks. Though only a few switches 204*a*-204*j* are illustrated, a switch fabric can include thousands or hundreds of thousands of switches and/or other network infrastructure devices.

In various implementations, the client devices 202*a*-202*e* can be connected to switches 204*a*-204*j* at the boundary or edges of the switch fabric 220. The switches 204*a*-204*j* may each have multiple connections to other switches 204*a*-204*j* within the switch fabric 220, such that there can be multiple paths from one client device 202*a*-202*e* to another client device 202*a*-202*e* across the switch fabric 220. In various implementations, packets from one client device 202*a*-202*e* to another client device 202*a*-202*g* can be sent using different paths in the switch fabric 220.

In various implementations, the example network 200 can include multiple grand masters 210*a*-210*c*. As discussed above, a grand master, which may also be referred to as a time provider or master time keeper, is a network device that can be configured to keep highly accurate time. A grand master can also provide highly accurate time to the network 200. To provide highly accurate time, each grand master 210*a*-210*c* can include or be in communication with a time source 212*a*-212*c*, such as an atomic clock or a GPS receiver, or another highly accurate clock source.

The grand masters 210*a*-210*c* can each provide a network time to the network 200 using a time keeping protocol, such as PTP or NTP. Each grand masters 210*a*-210*c* can be the root of a different time synchronization tree. In some cases, the different time synchronization trees may be non-overlapping, while in other cases the different time synchronization trees may be at least partially overlapping. "Overlapping," in this context, means that two time synchronization trees may include the same paths across the network 200 (e.g., from switch 204*b* to switch 204*h*, switch 204*i*, and switch 204*j*). In each case, the time provided by each grand masters 210*a*-210*c* can reach each client device 202*a*-202*e* in the network 200.

In the example of FIG. 2, the network 200 includes multiple grand masters 210a-210c that can be active simultaneously. Being simultaneously active means that two or more of the grand masters 210a-210c can be providing a network time to the network 200 at the same time, and that the client devices 202a-202e are able to synchronize to multiple network times at the same time. As discussed above, in other implementations, the client devices 202a-202e only synchronize to one network time, provided by one grand master. In contrast, in the example of FIG. 2, each client device 202a-202e can synchronize to two or more network times at the same time, or even to the network times provided by all of the grand masters 210a-210c. Though only three grand masters 210a-210c are illustrated in the example of FIG. 2, in other examples the network 200 can include many more grand masters, such as 100, several hundred, a thousand, several thousand, or some other number.

In various implementations, each client device 202a-202e can use multiple times from multiple grand masters 210a-210c to determine a single network time to use for either internal or external purposes. Determining a single time can include, for example, determining an average time, a median time, a mean time, or some other value that can be determined by combining multiple network times. In some implementations, the client devices 202a-202e can use a best fit technique such as nearest neighbor searching, least squares analysis, generalized estimation, linear estimated, weighted estimation, Bayesian estimation, or some other technique that can be used to converge on a common value from among the multiple network times. In some implementations, the client devices 202a-202e can remove some of the network times from consideration. For example, using a least squares analysis, network times that are outside of a range (e.g. more than 10 ns, 50 ns, 100 ns, 1 ms, or some other value) from the best fit may be determined to be outliers, and may be removed from consideration. As another example, the client devices 202a-202e can compute an average network time, and then eliminate any network time that is beyond a threshold value from the average time (e.g., any network time that is greater than or less than the threshold value). In this example, the client devices 202a-202e can combine the remaining values (e.g., by determining an average, a median, a mean, or some other value that can be determined from combing multiple values) to determine an official network time.

In some implementations, a client device 202a-202e can also use multiple network times to adjust the frequency of the client device's internal clock, so that the client device 202a-202e can maintain more accurate time between periodic updates of the network time. For example, when the client device 202a-202e computes the current network time from recently obtained network times, the client device 202a-202e can compare the current network time to the previous network time, and use the different to compute a clock frequency.

By synchronizing to multiple network times and using the multiple times to compute a network time, the client devices 202a-202e, and the network 200 as a whole, can better maintain a common time. For example, combining multiple network times can normalize network latencies, because each client device 202a-202e can be use the same or similar network times as the basis for the official network time. As another example, should a grand master 210a-210c become disabled or otherwise stop providing time to the network 200, the client devices 202a-202e may already have the network time from the other grand masters 210a-210 to use to determine the official network time. In this example, no delay need be incurred in waiting for the network 200 to converge on the time provided by a backup grand master.

In various implementations, the client devices 202a-202e can use the computed network time whenever an official network time is needed. For example, a client device 202a-202e can provide the official network time to software applications executing on the client device 202a-202e. As another example, the client device 202a-202e can use the official network time to compute network latency, to timestamp inbound or outbound packets, and so on.

In some implementations, a switch from the among the switches 204a-204j can, in addition simultaneously participating in multiple time synchronization trees, can also synchronize to the time being provided by the multiple time synchronization trees. That is, the switch can simultaneously synchronize to the multiple network times being distributed to the network 200. In some implementations, the switch can use the multiple network times to compute an official network time. In some implementations, the switch can distribute the official network time instead of the multiple network times. In these implementations, one or more client devices can receive the official network time form the switch instead of receiving the multiple network times.

In some implementations, the grand masters 210a-210c can also synchronize to network times provided by one or more other grand masters 210a-210c. In these implementations, a grand master (e.g., a first grand master 210a) can use the network times from other grand masters 210b-210c to determine whether the time being maintained by first grand master 210a is close to the time being maintained by the other grand masters 210b-210, or whether the first grand master's 210a time is far off. In this example, when the first grand master's time is too different from the time of the other grand masters 210b-210c, the first grand master 210a can signal a network administrator, or can automatically recalibrate, or can stop providing time to network, can take a combination of actions, or can take no action.

As noted above, a grand master can provide time to a network using a time keeping protocol. The time keeping protocol can define the manner in which the grand master synchronizes the time at a neighbor node to the time being maintained by the grand master. Each node in the network can use the same or a different time keeping protocol to provide the time to other nodes and/or to client devices.

Figure 3:
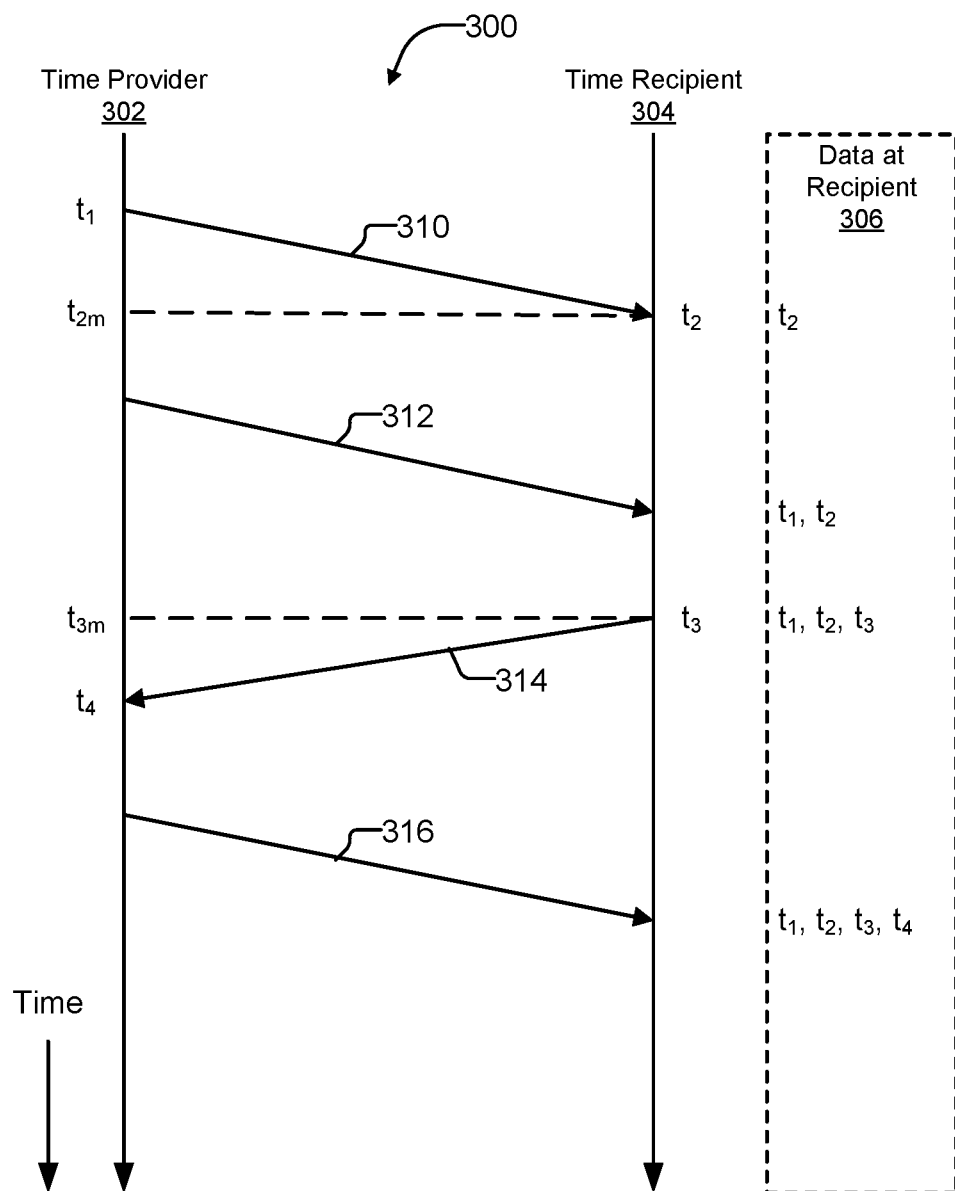
FIG. 3 illustrates an example of an exchange of network messages that can be used by a time provider to synchronize the time at a time recipient.

FIG. 3 illustrates an example of an exchange of network messages 300 that can be used by a time provider 302 to synchronize the time at a time recipient 304. Also illustrated is the data 306 stored by the time recipient 304 in the course of the exchange of messages 300. The particular messages 300, the contents of each message, and the timing of the transmission of each message can be determined by a time synchronization protocol. For example, the particular messages 300 illustrated in this example are based on the Precision Time Protocol (PTP). The Precision Time Protocol is defined in Institute of Electrical and Electronics Engineers (IEEE) 1588.

The exchange of messages 300 involves two devices (the time provider 302 and the time recipient 304 in this example) that share a network link, and thus are neighboring nodes on a network. Sharing a network link, in this context, means that the two devices need only the network link to communicate, and that there is no intervening device between the two devices (e.g., a server connected to, and communicating to a network through, a switch is a neighbor to the switch, but another server connected to the same switch is not a neighbor of the first server, but only a neighbor of the switch).

The time provider 302 is a network device, such as a host device or a network infrastructure device. Host devices include servers, desktop computers, laptop computers, handheld computers, personal digital assistants, and smartphones, among other computing devices. Network interface devices include routers, switches, hubs, repeaters, network controllers, and gateway devices, among others. The time recipient 304 is also a network device. Both the time provider 302 and the time recipient 304 are capable of independently maintaining a time, including a date, hour, minute, seconds, and/or fractions of a second. The time provider 302 is considered the master or source, in that the time being maintained by the time recipient will be synchronized to the time of the time provider 302. The time recipient 304 is thus considered the slave or destination.

The exchange of messages 300 can be used to establish the difference between the time maintained by the time provider 302 and the time maintained by the time recipient 304. This difference will be referred to as the clock offset. The exchange of messages 300 can also be used to determine an approximate network delay over the link between the devices. The network delay is time it may take for messages to travel over the network link between the time provider 302 and the time recipient 304. The delay across the link can be assumed to be symmetric, since each of the messages 300 should have been transmitted over the same network link.

The clock offset and the network delay can be used in various ways to change to the time maintained by the time recipient 304 to be approximately (e.g., within an acceptable margin of difference) the same as the time maintained by the time provider 302. For example, a clock offset value of five indicates that the time at the time recipient 304 is five seconds ahead of the time at the time provider 302. In this example, the time recipient 304 can adjust its time keeping circuit back by five seconds. Additionally, if the network delay is one second, the time recipient 304 can further adjust its time keeping circuit back by one second, to accommodate the network delay.

The example exchange of messages 300 is initiated by the time provider 302. Upon transmitting the first message 310, the time provider 302 records a current time, $t_1$. The current time $t_1$ is based on the time being maintained by the time provider 302. The time $t_1$ is captured as close as possible to the time at which the message 310 is transmitted by the time provider 302. For example, $t_1$ may be captured as the message 310 begins to exit a port of the time provider 302.

When the time recipient 304 receives the first message 310, the time recipient 304 records a current time $t_2$. The time $t_2$ is taken from the time being maintained by the time recipient 304. The time $t_2$ is recorded as close as possible to when the messages 310 is received. For example, the time $t_2$ may be recorded in a port that receives the message 310, as soon as the message 310 has begun to be received. The time recipient 304 stores the time $t_2$.

The time provider 302 next sends a second message 312, which contains the value of $t_1$. Upon receiving the second message 312, the time recipient 304 can compute the difference between $t_2$ and $t_1$. The absolute value of the result of this computation is an approximate difference between the time maintained by the time provider 302 and the time maintained by the time recipient 304, possibly including the network delay. This value will be referred to as the master-to-slave difference.

The time recipient 304 next sends a third message 314, and record the current time, $t_3$, at the time the message 314 is sent. The time $t_3$ is based on the time maintained by the time recipient 304. Upon receiving the message 314, the time provider 302 also records a current time, $t_4$, in this case based on the time being maintained by the time provider 302.

The time provider 302 next sends a fourth message 316, which contains the value of $t_4$. Upon receiving this message 316, the time recipient 304 can compute the difference between $t_3$ and $t_4$. The absolute value of the result of this computation is an approximate difference between the time maintained by the time recipient 304 and the time maintained by the time provider 302, possibly including the network delay. This value will be referred to as the slave-to-master difference.

Using the master-to-slave difference and the slave-to-master difference, the time recipient 304 can now compute both a clock offset and a network delay. The clock offset can be computed by summing the master-to-slave different and the slave-to-master difference, and dividing the result by two. The time recipient 304 can use the clock offset to adjust its time, for example by adding or subtracting the clock offset, as appropriate. The network delay can be computed by subtracting the slave-to-master difference from the master-to-slave difference, and dividing the result by two. The absolute value of this computation is the network delay. The time recipient 304 can use the network delay to adjust timestamps received from the time provider 302. For example, packets received from the time provider device 302 can be assumed to have been sent n seconds in the past, where n is the network delay.

The time provider 302 may initiate the exchange of messages periodically, to ensure that the time at the time recipient 304 remains synchronized with the time at the time provider 302. Small variations in the time keeping circuits of different devices may cause each device's time to gradually change away from the time of the other device. Periodic synchronization can reduce such drift to having a negligible effect.

In some cases, the time provider 302 may be providing the time for more than one time recipient. In these cases, the time provider 302 and each time recipient can exchange a similar sequence of messages 300. The time provider 302 can exchange messages with each time recipient in parallel or serially. Each time recipient will subsequently synchronize their own time to the time of the time provider 302.

As discussed above, time can be distributed across a network using a tree structure. Hence, the time recipient 304 can also be a time provider. In some cases, once the time recipient 304 has synchronized to the time of the time provider 302, the time recipient 304 may then proceed to provide the time to one or more time recipients. In some cases, the time recipient 304 may provide to other time recipients periodically, where the period may not be the same as the period used by the time provider 302 to provide the time to the time recipient 304.

FIG. 3 illustrates one example of an exchange of messages 300 that can be used by two devices to synchronize to the same time. In various implementations, other messages, fewer messages, more messages, and/or messages with different contents can be used.

Figure 4:
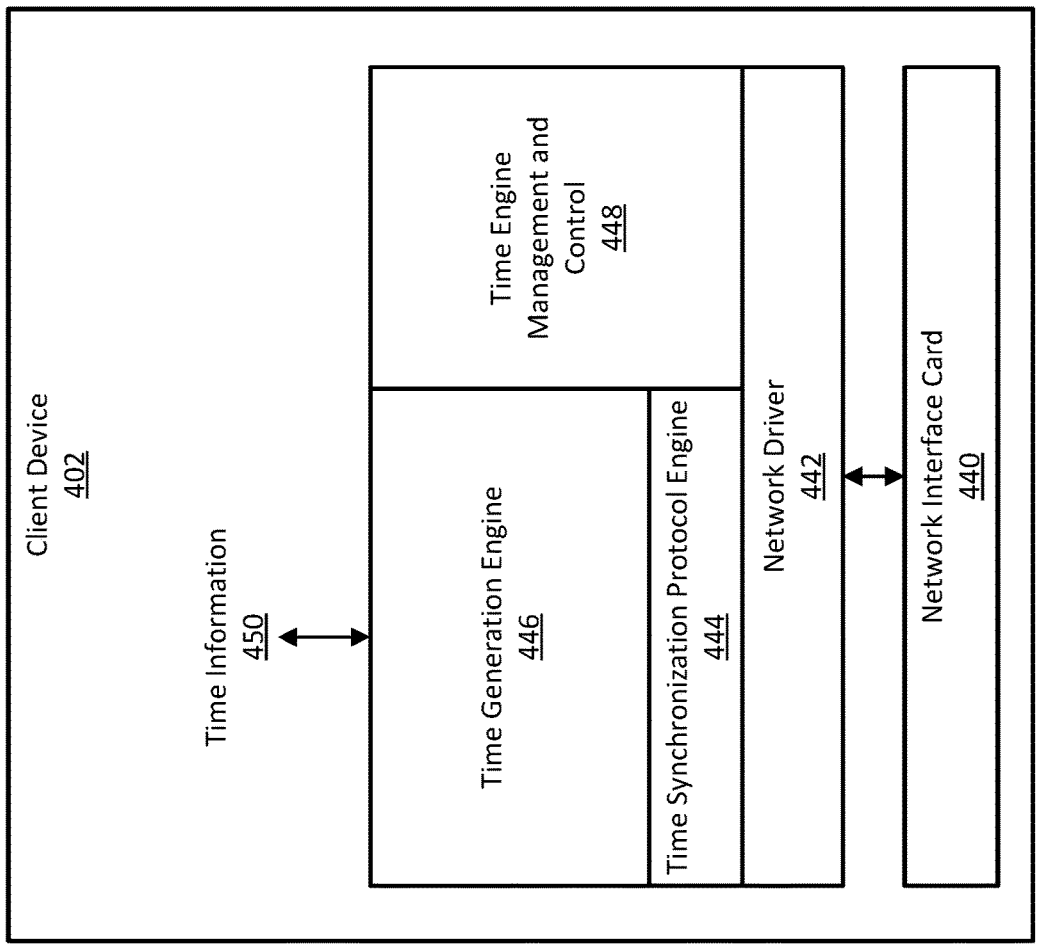
FIG. 4 illustrates an example of hardware and software for synchronizing time in a client device.

FIG. 4 illustrates an example of hardware and software for synchronizing time in a client device 402. The hardware of the client device 402 can include a network interface card 440, through which the client device 402 can communicate with a network. The software of the client device 402 can include a network driver 442, which can manage communications with other software running on the client device 402 and the network interface card 440. The network interface card 440 and the network driver 442 can be used by the client device 402 for any communications with the network, in addition to communications for purposes of synchronizing to a network time.

Software for synchronizing to the network time can include a time synchronization protocol engine 444, a time generation engine 446, and a time engine management and control 448. These software modules are given as examples of time-related functionality that may be included in the client device. In various implementations, these modules can go by other names, and/or the operations of these modules can be conducted by other modules, such as by an operating system and/or a hypervisor. The client device 402 can also include other software modules for other operations.

The time synchronization protocol engine 444 can implement a time synchronization protocol, such as PTP or NTP or some other time synchronization protocol. In various implementations, the time synchronization protocol engine 444 can execute the protocol, including sending and receiving packets exchanged for synchronizing the time, determining whether or when to synchronize, and so on.

The time generation engine 446 can use the data obtained by the time synchronization protocol engine 444 to determine the network time. For example, the time generation engine 446 can execute the computations described above with respect to FIG. 3, and can, as illustrated in FIG. 4, output time information 450 that can be used by other applications executing on the client device 402.

The time engine management and control 448 can coordinate the operations of the time protocol synchronization engine 444 and time generation engine 446. For example, the time engine management and control 448 can include an interface through which time-related operations can be configured. As another example, the time engine management and control 448 can reset the time synchronization protocol engine 444 should the time synchronization protocol engine 444 experience a protocol error, a missing packet, or some other problem. As another example, in some implementations, the time engine management and control 448 can adjust the internal clock of the client device 402 according to the time determined by the time generation engine 446.

Figure 5:
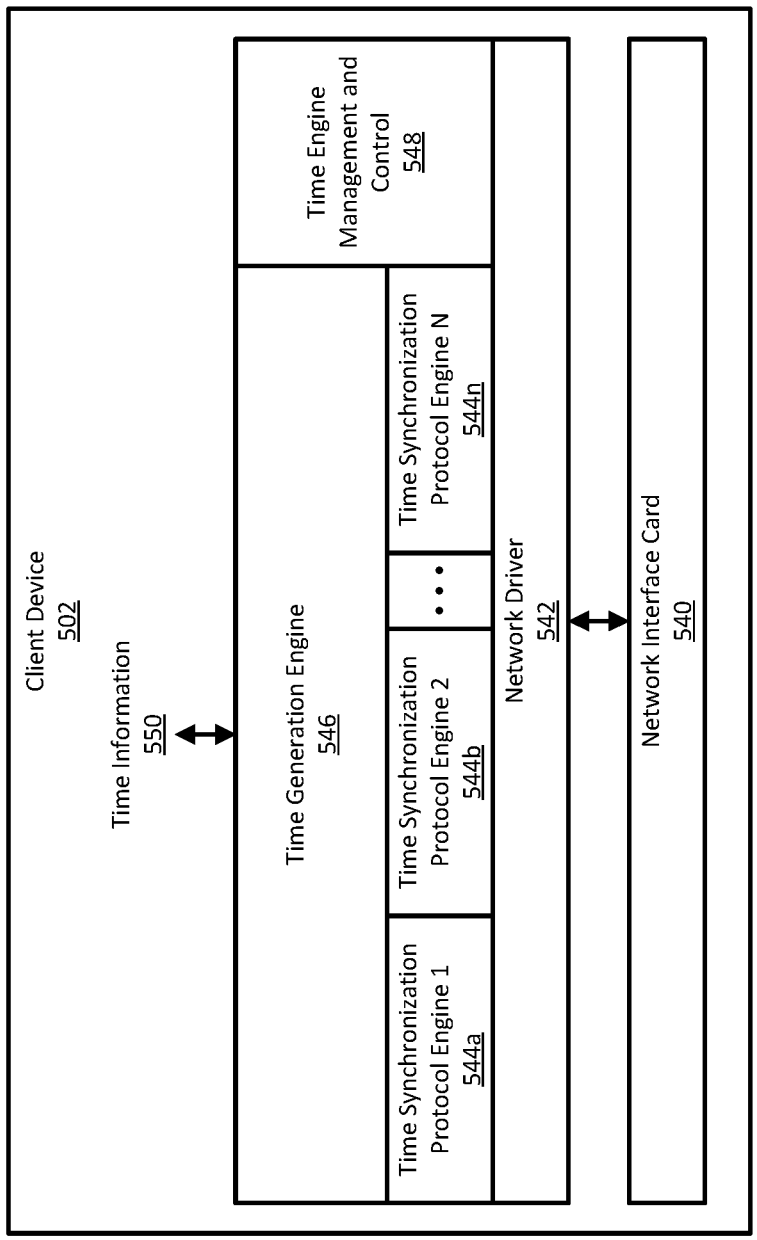
FIG. 5 illustrates an example of hardware and software by which a client device can simultaneously synchronize to multiple network times.

FIG. 5 illustrate an example of hardware and software by which a client device 502 can simultaneously synchronize to multiple network times. The hardware of the client device 502 can include a network interface card 540, through which the client device 502 can communicate with a network. The software of the client device 502 can include a network driver 542, which can manage communications with other software running on the client device 502 and the network interface card 540. The network interface card 540 and the network driver 542 can be used by the client device 502 for any communications with the network, in addition to communications for purposes of synchronizing to a network time.

Software for synchronizing to the network time can include multiple time synchronization engines 544a-544n, a time generation engine 546, and a time engine management and control 548. These software modules are given as examples of time-related functionality that may be included in the client device. In various implementations, these modules can go by other names, and/or the operations of these modules can be conducted by other modules, such as by an operating system and/or a hypervisor. The client device 502 can also include other software modules for other operations.

The time synchronization protocol engines 544a-544n can each implement a time synchronization protocol. In some implementations, the time synchronization protocol engines 544a-544n implement the same time synchronization protocol. In some implementations, the time synchronization protocol engines 544a-544n can implement different time synchronization protocols. In various implementations, each time synchronization protocol engine 544a-544n is configured to synchronize to the time being distributed by a different master time keeper. In some implementations, two or more of the time synchronization protocol engines 544a-544n can simultaneously execute packet exchanges in order to synchronize to a time. In these implementations, the network driver 542 or the time engine management and control 548 can direct packets from the network to the appropriate time synchronization protocol engines 544a-544n. In some implementations, the time synchronization protocol engines 544a-544n can be configured to have non-overlapping synchronization cycles.

The time generation engine 546 can take the time data obtained by the time synchronization protocol engines 544a-544n and can output time information 550 to applications executing on the client device 502. In various implementations, the time generation engine 546 can include processes for combining the data obtained by the multiple time synchronization protocol engines 544a-544n to determine a single set of time data. For example, the time generation engine 546 can include processes for determining an average, an estimation, and/or executing a regression analysis.

The time engine management and control 548 can coordinate the operations of the time synchronization protocol engines 544a-544n and the time generation engine 546. For example, the time engine management and control 548 can control which time synchronization protocol engines 544a-544n can be active at any given time. As another example, the time engine management and control 548 can select which of the time synchronization protocol engines 544a-544n should obtain time from a particular time synchronization tree. As another example, the time engine management and control 548 can control the method used by the time generation engine 546 to determine the official network time.

Figure 6:
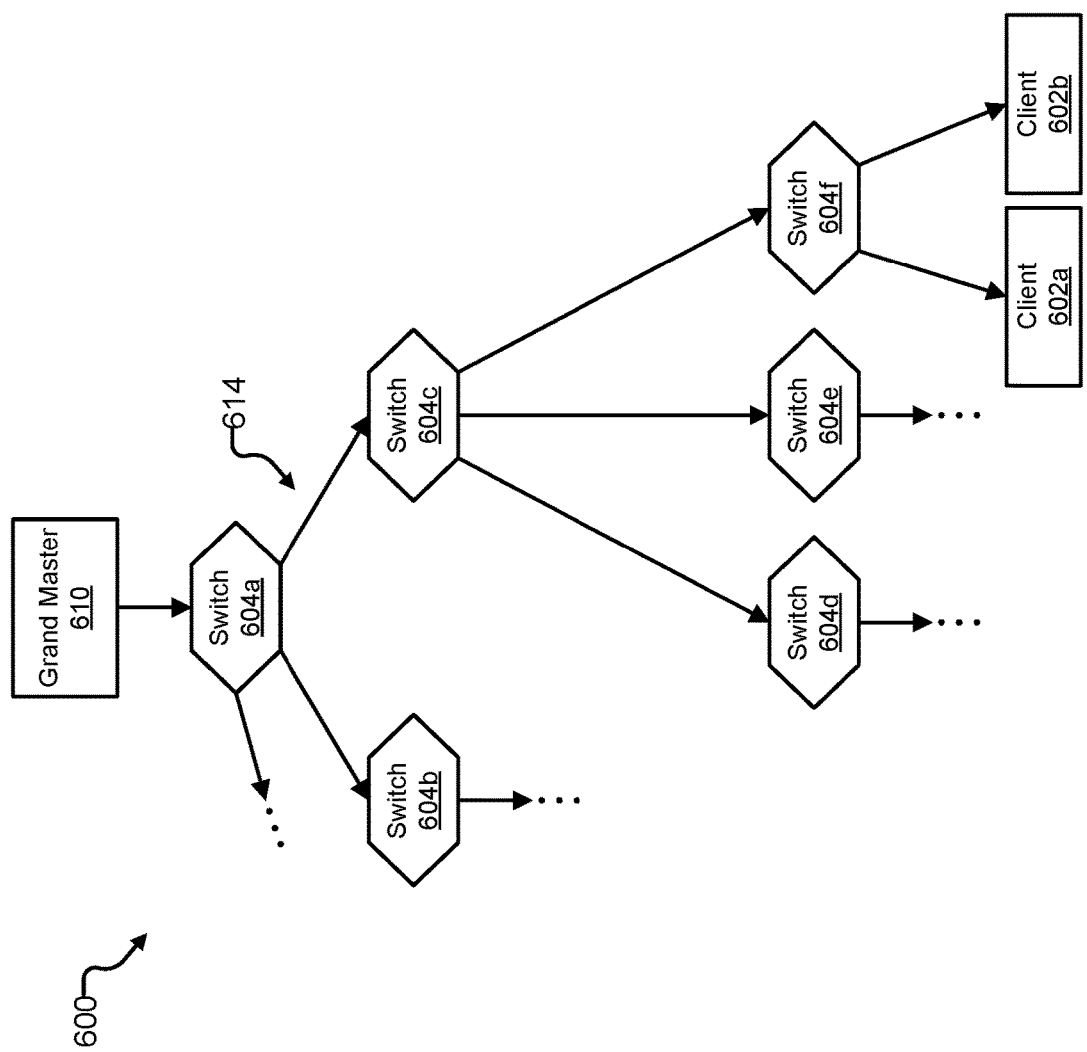
FIG. 6 illustrates an example of a part a network, arranged in this example to illustrate a partial time synchronization tree.

FIG. 6 illustrates an example of a part a network 600, arranged in this example to illustrate a partial time synchronization tree 614. The example part of the network 600 includes switches 604a-604f of a switch fabric and several network devices configured as client devices 602a-602b. The part of the network 600 that is not illustrated can include many more switches and client devices, where each client device is a leaf or terminal node in the time synchronization tree 614.

The network 600 also includes a grand master 610 or master time keeper, at the top or root of the time synchronization tree 614. In this example, the grand master 610 provides time to a first switch 604a, which can synchronize an internal clock to the time maintained by the grand master 610. The first switch 604a can provide the time to other switches, including a switch 604b and a switch 604c. In this example, switch 604c provides the time to a switch 604d, a switch 604e, and a switch 604f. Switch 604f can then provide the time to the two client devices 602a-602b.

The time synchronization tree 614 provides a structure over which the time maintained by the grand master 610 can be distributed to all the client devices in the network, including the illustrated example client devices 602a-602b. But should the grand master 610 go offline, or should a link in the path from the grand master 610 to either client device 602a-602b become disabled, then the client devices 602a-602b will no longer be able to receive the time from the grand master 610. Over time, the time maintained by each client device 602a-602b may deviate, such that each may be maintaining a different time. Additionally, in examples where the network 600 is very large, the number of links between the grand master 610 and the client devices 602a-602b may considerable. In these examples, network latency may affect the time received by the client devices 602a-602b, such that the time at the client devices 602a-602b is not the same as the time of the grand master 610.

Figure 7:
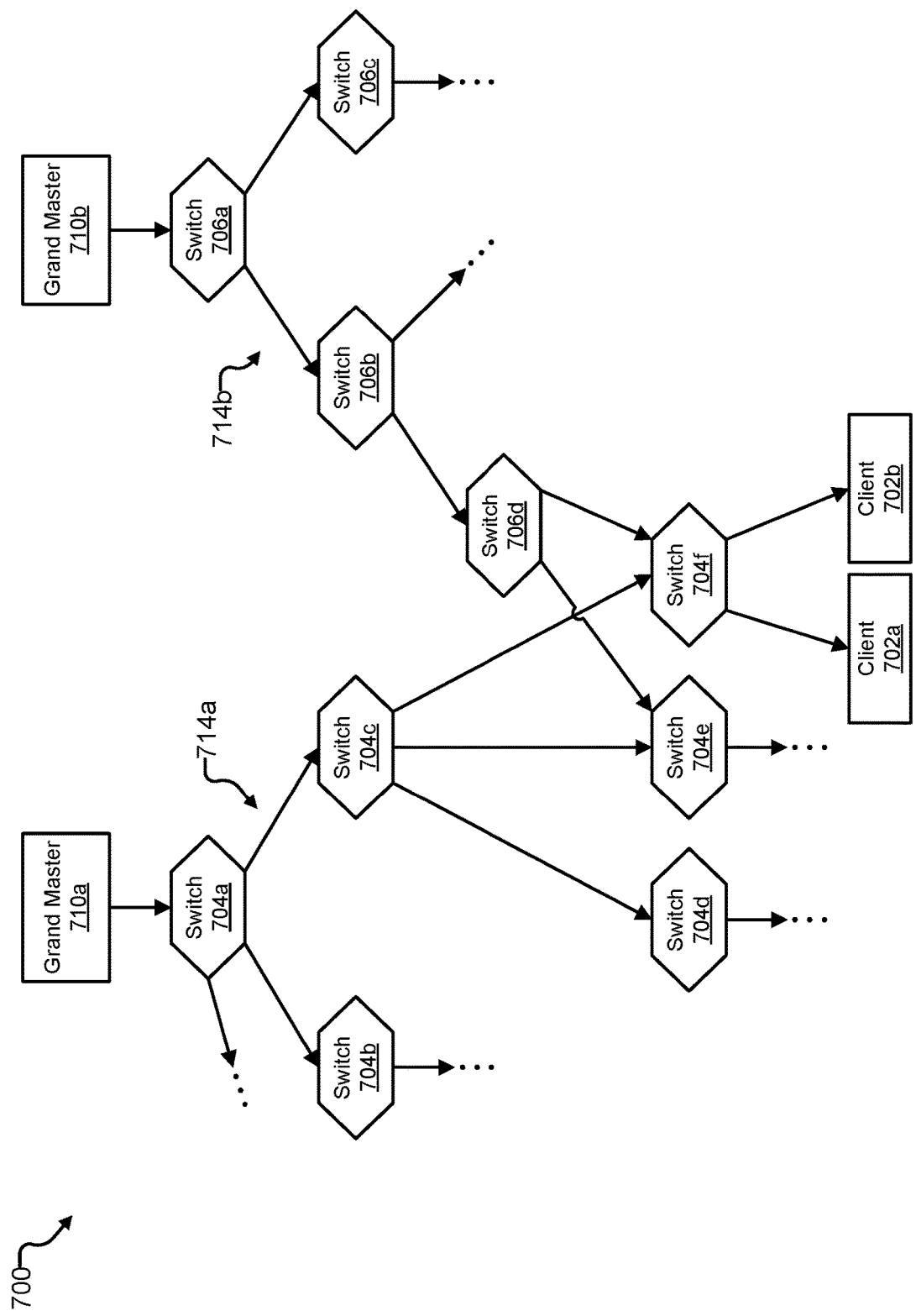
FIG. 7 illustrates an example of a part of a network that includes two grand masters.

FIG. 7 illustrates an example of a part of a network 700 that includes two grand masters 710a-710b. The example partial network 700 includes switches 704a-704f, 706a-706d of a switch fabric, and several network devices configured as client devices 702a-702b. The part of the network 700 that is not illustrated can include many more switch and client devices, where each client device is a leaf or terminal node in either of the illustrated time synchronization trees 714a-714b. The network 700 can also include additional grand masters, where some or all of the additional grand masters can provide a time to the two illustrated client devices 702a-702b, as well as to other client devices.

In the illustrated example, each grand master 710a-710b is the top or root of a time synchronization tree 714a-714b. Specifically, the first grand master 710a provides a time to a first switch 704a in a first time synchronization tree 714a. The first switch 704a can provide the time to other switches in the first time synchronization tree 714a, including a switch 704b and a switch 704c. In this example, switch 704c provides the time to a switch 704d, a switch 704e, and a switch 704f. Switch 704f can then provide the time to the two client devices 702a-702b.

The second grand master 710b provides a time to a switch 706a in a second time synchronization tree 714b. The switch 706a provides the time from the second grand master 710b to two other switches in the second time synchronization tree 714b, a switch 706b and a switch 706c. The switch 706b provides this time to a switch 706d. The switch 706d provides the time from the second grand master 710b to switch 704e and switch 704f, which, as noted above, are also in the first time synchronization tree 714a. In many cases, time synchronization trees for different grand masters can overlap in this fashion. Though in some cases client devices can be connected to more than one switch, often a client devices is only connected to one switch, and hence two time synchronization may have to include the same switch. The switches 704a-704f, 706a-706d serve to move network traffic between client devices, and are not solely dedicated to time distribution. Additionally, at any point in time a time synchronization tree 714a-714b can be reconfigured to include other switches, and/or an entirely new time synchronization tree 714a-714b can be configured, using the same switches 704a-704f, 706a-706d.

In various implementations, to enable a switch (e.g., the switch 704f) to be part of more than one time synchronization tree, the switch 704f can use different ports for the different time synchronization trees 714a-714b. For example, the switch 704f can receive the time from switch 704c over port 1 and receive the time from switch 706d over port 2. An intermediate switch, such as the switch 706d, can also distribute the time over different ports. For example, the switch 706d can provide the time from the second time synchronization tree 714b to switch 704e and switch 704f using ports 10 and 11, respectively. In this example, the switch 706d can provide the time for another time synchronization tree (not illustrate here) to another switch also not illustrated here), using port 21.

In various implementations, both example time synchronization trees 714a-714b are active simultaneously. This means that both grand masters 710a-710b are distributing times to the network 700, using their respective time synchronization trees 714a-714b. The client devices 702a-702b can also be simultaneously synchronizing to the two times being provided by the grand masters 710a-710b. In some cases, one of the client devices 702a-702b can execute packet exchanges with the switch 704f to synchronize to both network times at the same time. In some cases, the client device 702a-702b can sequentially synchronize to the two network times. In some cases, the synchronization cycles may be offset; for example, the first grand master 710a may synchronize the first time synchronization tree 714a at every 5, 10, 15, 20, etc. milliseconds, while the grand master 710b synchronized the second time synchronization tree 714b at every 7, 12, 17, 22, etc., milliseconds. In other examples, the client devices 702a-702b can also synchronize to network times provided by grand masters that are not illustrated here.

In various implementations, the client devices 702a-702b can use the network times from both the grand masters 710a-710b (and other grand masters, not illustrated here) to determine an single, official network time. For example, the client devices 702a-702b can combine the multiple times to determine an average, a median, a mean, or some other value. As another example, the client devices 702a-702b can implement an estimation technique and/or regression analysis (e.g., linear regression, leas squares, polynomial regression, etc.). In these and other examples, the client devices 702a-702b can be configured to remove outliers from consideration, where outliers are network times that deviate from the norm by more than a threshold value.

Figure 8:
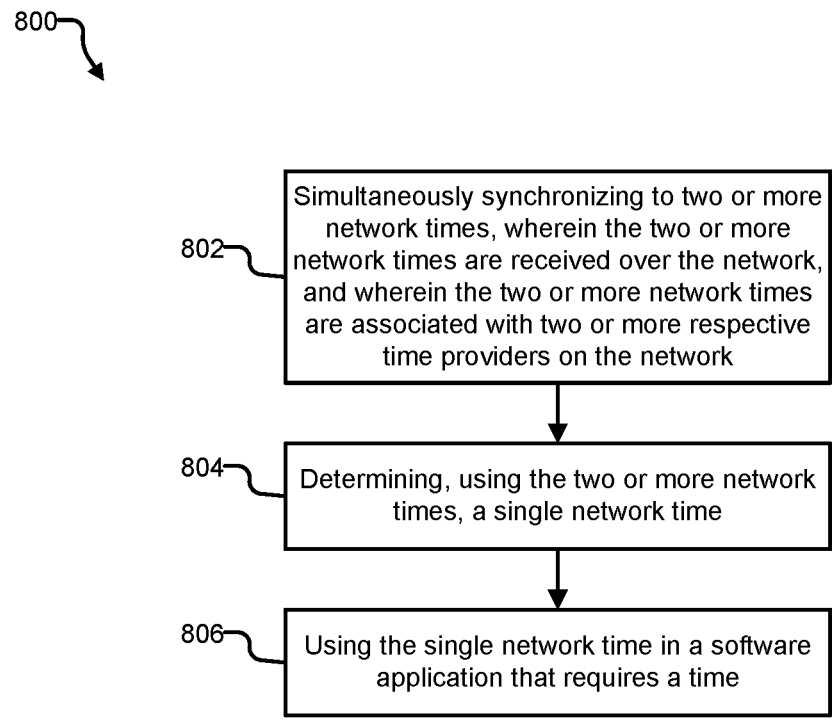
FIG. 8 illustrates an example of a process for a network device to synchronize to a single, official network time.

FIG. 8 illustrates an example of a process 800 for a network device to synchronize to a single, official network time. These methods may be implemented by the systems described above, such as for example the client device illustrated in FIGS. 1, 2, 6, and 7.

At step 802, the client device can be configured to simultaneously synchronize to two or more network times, wherein the two or more network times are received over the network, and wherein the two or more network times are associated with two or more respective time providers on the network. Simultaneously synchronizing, in this context, means that more than one network time is available from the network, or that more than one time provider is distributing time simultaneously. The two or more network times can arrive at nearly the same time (e.g., the packets that include the two or more network times can overlap one another), the two or more network times can arrive sequentially, the two or more network times can arrive at fixed offsets or intervals, and/or the two or more network times can arrive at random intervals.

At step 804, the client device can determine, using the two or more network times, a single network time. To determine the single network time, the client device can use various techniques. For example, the client device can combine the two or more network times, for example by computing an average, a mean, a median, a most common, or some other mathematical operation. As another example, the client device can use a best fit technique, such as a regression analysis or an estimation analysis.

In some implementations, when determining the single network time, the client device can eliminate outliers. That is, the client device can identify a particular network time that is, for example, outside of a range (e.g., greater than or less than 1 ns, 5 ns, 10 ns, 1 ms, or some other value from an average value). The client device can then discard or disregard the particular network time when determining the single network time.

In some implementations, the client device can use the two or more network times to determine a clock frequency. For example, the client device can determine the difference between the current network time and the last network time, and use the difference to determine a frequency. In this example, the client device can the adjust the frequency of an internal clock to the determined clock frequency.

In some implementations, the client device synchronizes to a network time using an exchange of packets. In these implementations, the exchange can be defined by a time synchronization protocol, such as PTP or NTP. The packets in the packet exchange can include a network time.

At step 806, the client device can use the single network time in a software application that requires the time. For example, a software application may attach time stamps to file modifications, data generation, and/or packets received from the network. As another example, the software application may compute network latency for transmitted and/or received packets. As another example, the software application may use time to determine uptime or downtime for the client device, for virtual machines running on the client device, for determining bandwidth usage by other applications on the client device, and so on.

In some implementations, the network that includes the client device may be in a data center. A data center can include a network that is under the control of one operator, who administers the network and/or controls access to the network. The data center can be used for remote storage, processing, and/or distribution of large amounts of data. In some cases, the operator of the data center may lease resources in the data center to outside entities. In some cases, the data center's resources may be exclusive to the operator.

Figure 9:
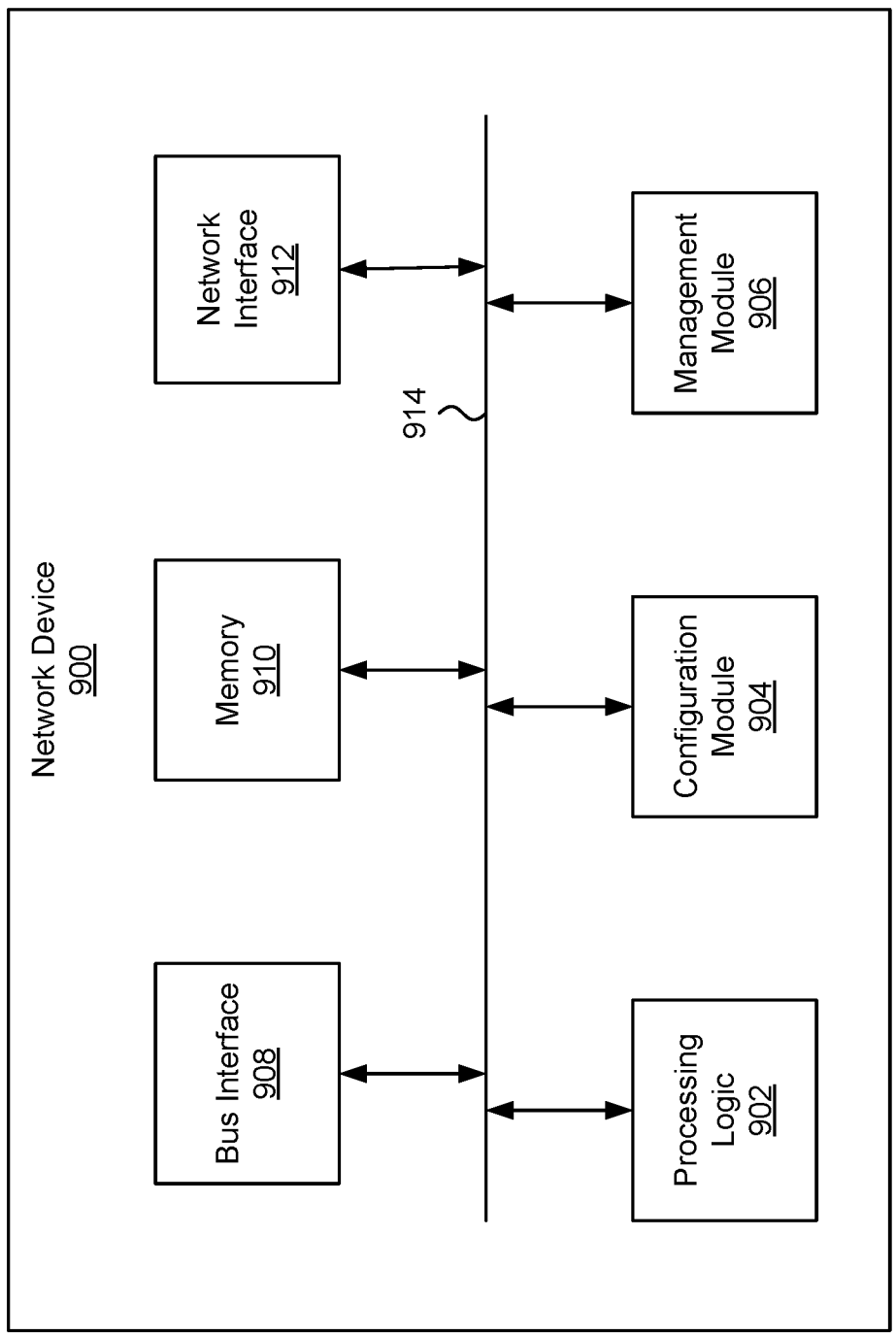
FIG. 9 illustrates an example of a network device, according to certain aspects of the disclosure.

FIG. 9 illustrates an example of a network device 900. Functionality and/or several components of the network device 900 may be used without limitation with other embodiments disclosed elsewhere in this disclosure, without limitations. A network device 900 may facilitate processing of packets and/or forwarding of packets from the network device 900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 900 may be the recipient and/or generator of packets. In some implementations, the network device 900 may modify the contents of the packet before forwarding the packet to another device. The network device 900 may be a peripheral device coupled to another computer device, a switch, a router or any other suitable device enabled for receiving and forwarding packets.

In one example, the network device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The network device 900 may include additional modules, not illustrated here, such as components discussed with respect to the nodes disclosed in FIG. 10. In some implementations, the network device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the network device 900, while in other cases some or all of the memory may be external to the network device 900. The memory 910 may store an operating system comprising executable instructions that, when executed by the processing logic 902, provides the execution environment for executing instructions providing networking functionality for the network device 900. The memory may also store and maintain several data structures and routing tables for facilitating the functionality of the network device 900.

In some implementations, the configuration module 904 may include one or more configuration registers. Configuration registers may control the operations of the network device 900. In some implementations, one or more bits in the configuration register can represent certain capabilities of the network device 900. Configuration registers may be programmed by instructions executing in the processing logic 902, and/or by an external entity, such as a host device, an operating system executing on a host device, and/or a remote device. The configuration module 904 may further include hardware and/or software that control the operations of the network device 900.

In some implementations, the management module 906 may be configured to manage different components of the network device 900. In some cases, the management module 906 may configure one or more bits in one or more configuration registers at power up, to enable or disable certain capabilities of the network device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the network device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 900 may include multiple network interface modules, each configured to communicate with a different network. For example, in these implementations, the network device 900 may include a network interface module for communicating with a wired Ethernet network, a wireless 802.11 network, a cellular network, an Infiniband network, etc.

The various components and modules of the network device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 10.

Figure 10:
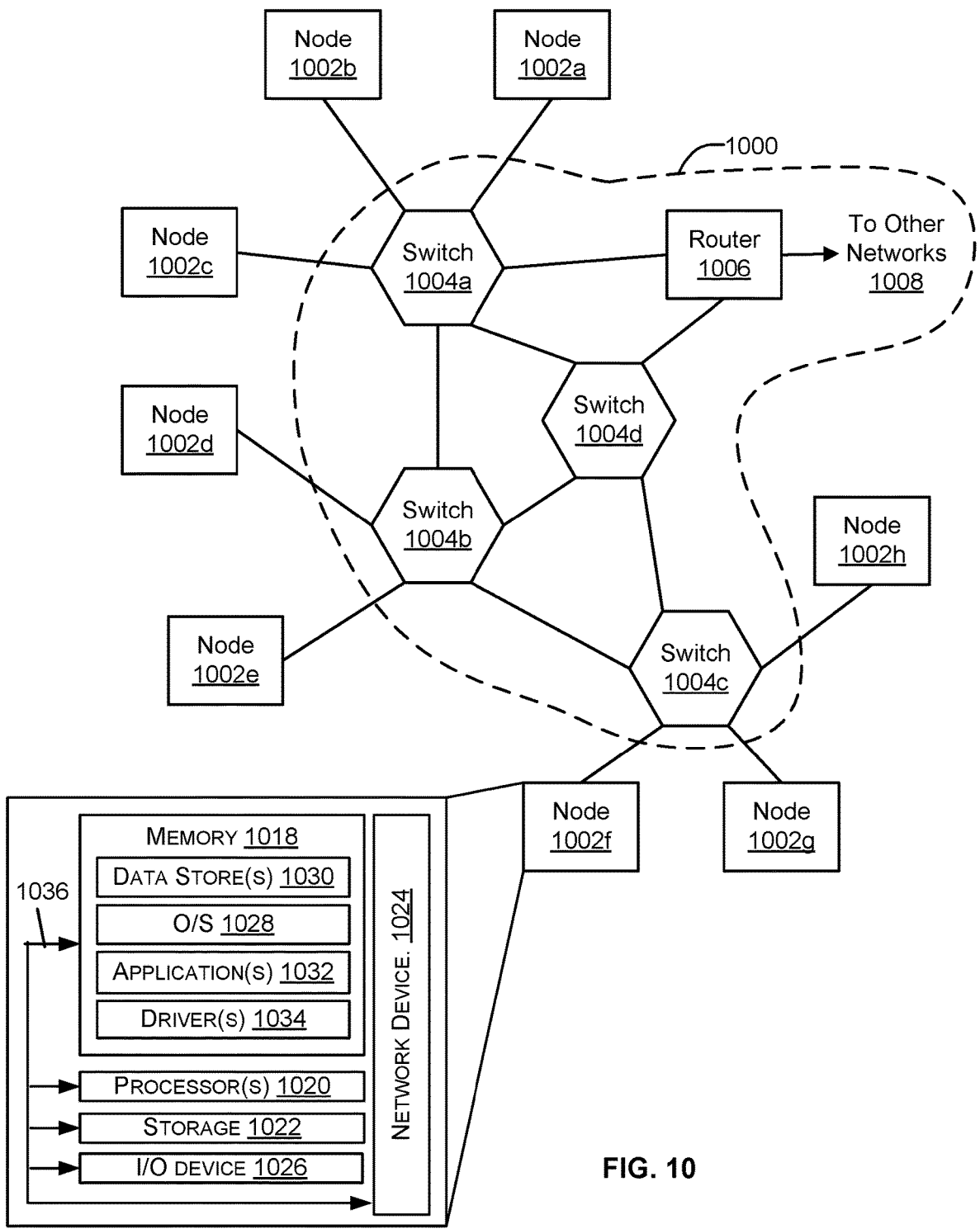
FIG. 10 illustrates an example architecture for features and systems described herein that includes one or more service provider computers and/or a user device connected via one or more networks, according to certain aspects of the disclosure.

FIG. 10 illustrates a network 1000, illustrating various different types of network devices 900 of FIG. 9, such as nodes comprising the network device, switches and routers. In certain embodiments, the network 1000 may be based on a switched architecture with point-to-point links. As illustrated in FIG. 10, the network 1000 includes a plurality of switches 1004a-1004d, which may be arranged in a network. In some cases, the switches are arranged in a multi-layered network, such as a Clos network. A network device 900 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1004a-1004d may be connected to a plurality of nodes 1002a-1002h and provide multiple paths between any two nodes.

The network 1000 may also include one or more network devices 900 for connection with other networks 1008, such as other subnets, LANs, wide area networks (WANs), or the Internet, and may be referred to as routers 1006. Routers use headers and forwarding tables to determine the best path for forwarding the packets, and use protocols such as internet control message protocol (ICMP) to communicate with each other and configure the best route between any two devices.

In some examples, network(s) 1000 may include any one or a combination of many different types of networks, such as cable networks, the Internet, wireless networks, cellular networks and other private and/or public networks. Interconnected switches 1004a-1004d and router 1006, if present, may be referred to as a switch fabric, a fabric, a network fabric, or simply a network. In the context of a computer network, terms "fabric" and "network" may be used interchangeably herein.

Nodes 1002a-1002h may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002a-1002h, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002a-1002h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix®, Linux®, Windows®, macOS®, iOS®, Android™ and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to the nodes 1002a-1002h. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002a-1002h or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002a-1002h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002a-1002h.

Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002a-1002h may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel or channels 1036 may take the form of a bus, a ring, a switching fabric, or a network.

The node(s) 1002a-1002h may also contain network device(s) 1024 that allow the node(s) 1002a-1002h to communicate with a stored database, another computing device or server, user terminals and/or other devices on the network(s) 1000. The network device(s) 1024 of FIG. 10 may include similar components discussed with reference to the network device 900 of FIG. 9.

In some implementations, the network device 1024 is a peripheral device, such as a PCI-based device. In these implementations, the network device 1024 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1024 may be connected to a computing system using a PCIe interface.

A PCI-based device may include one or more functions. A "function" describes operations that may be provided by the network device 1024. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1024 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer network in a data center, comprising:
    a plurality of switch devices, wherein the plurality of switch devices are interconnected to provide multiple paths across the computer network;
    two time providers, wherein the two time providers are each network devices configured to simultaneously distribute respective network times to the computer network, wherein the network times are distributed using the plurality of switch devices; and
    a plurality of client devices connected to the plurality of switch devices, wherein the plurality of client devices are each network devices, wherein each of the plurality of client devices is configured to receive the two network times, and wherein each of the plurality of client devices is configured to determine a single network time using the two network times.

2. The computer network of claim 1, wherein, at a switch from the plurality of switches, a first network time is received at a first port and distributed to a first set of ports, wherein a second network time is received at a second port and distributed to a second set of ports, wherein the second port is different from the first port, and wherein the second set of ports is different from the first set of ports.

3. The computer network of claim 1, wherein a first time provider from the two time providers is configured to synchronize to a network time provided by a second time provider from the two time providers, and wherein the first time provider is configured to determine a difference between the network time provided by the first time provider and a network time provided by the second time provider.

4. The computer network of claim 1, wherein the two time providers each include a respective clock source, wherein the clock source is an atomic clock or a satellite navigation system receiver.

5. The computer network of claim 1, where the time providers distribute time using Precision Time Protocol (PTP) or Network Time Protocol (NTP).

6. A computer-implemented method, comprising:
    receiving, by a network device, two simultaneously distributed network times over a network, wherein the two network times are associated with two respective time providers on the network;
    simultaneously synchronizing to the two network times;
    determining, using the two network times, a single network time; and
    using the single network time in a software application that requires a time.

7. The computer-implemented method of claim 6, wherein determining the single network time includes combining the two network times.

8. The computer-implemented method of claim 7, wherein combining the two network times normalizes a difference between the two network times.

9. The computer-implemented method of claim 6, wherein determining the single network time includes using a best fit technique.

10. The computer-implemented method of claim 6, wherein determining the single network time includes:
    identifying a particular network time from the two network times that is outside of a range; and
    discarding the particular network time when determining the single network time.

11. The computer-implemented method of claim 6, further comprising:
    determining, using the two network times, a clock frequency; and
    adjusting a clock frequency of the network device to the determined clock frequency.

12. The computer-implemented method of claim 6, further comprising:
    exchanging packets with the network, wherein the packets are exchanged according to a time synchronization protocol, and wherein the two network times are determined using data included in the packets.

13. A network device, comprising:
    one or more processors; and
    a non-transitory computer-readable medium including instructions that, when executed by the one or more processors, cause the one or more processors to perform operations including:
    simultaneously synchronizing to two network times, wherein the two network times are received over a network, and wherein the two network times are associated with two respective time providers on the network;
    determining, using the two network times, a single network time; and
    using the single network time in a software application.

14. The network device of claim 13, wherein determining the single network time includes combining the two network times.

15. The network device of claim 14, wherein combining the two network times normalizes a difference between the two network times.

16. The network device of claim 13, wherein determining the network time includes using a best fit technique.

17. The network device of claim 13, wherein determining the single network time includes:
    identifying a particular network time from the two network times that is outside of a range; and discarding the particular network time when determining the single network time.

18. The network device of claim 13, the operations further comprising:
   determining, using the two network times, a clock frequency; and
   adjusting a clock frequency of the network device to the determined clock frequency.

19. The network device of claim 13, the operations further comprising:
   exchanging packets with the network, wherein the packets are exchanged according to a time synchronization protocol, and wherein simultaneously synchronizing to the two network times includes using data included in the packets.

20. The network device of claim 13, wherein the network is in a data center.

* * * * *